Oct. 3, 1939.　　　F. J. LAPOINTE　　　2,174,984
BROACHING MACHINE
Filed Oct. 10, 1938　　　4 Sheets-Sheet 1

INVENTOR.
Francis J. Lapointe,
BY
ATTORNEY.

Oct. 3, 1939.　　　F. J. LAPOINTE　　　2,174,984
BROACHING MACHINE
Filed Oct. 10, 1938　　　4 Sheets-Sheet 2

INVENTOR.
Francis J. Lapointe,
BY
his ATTORNEY.

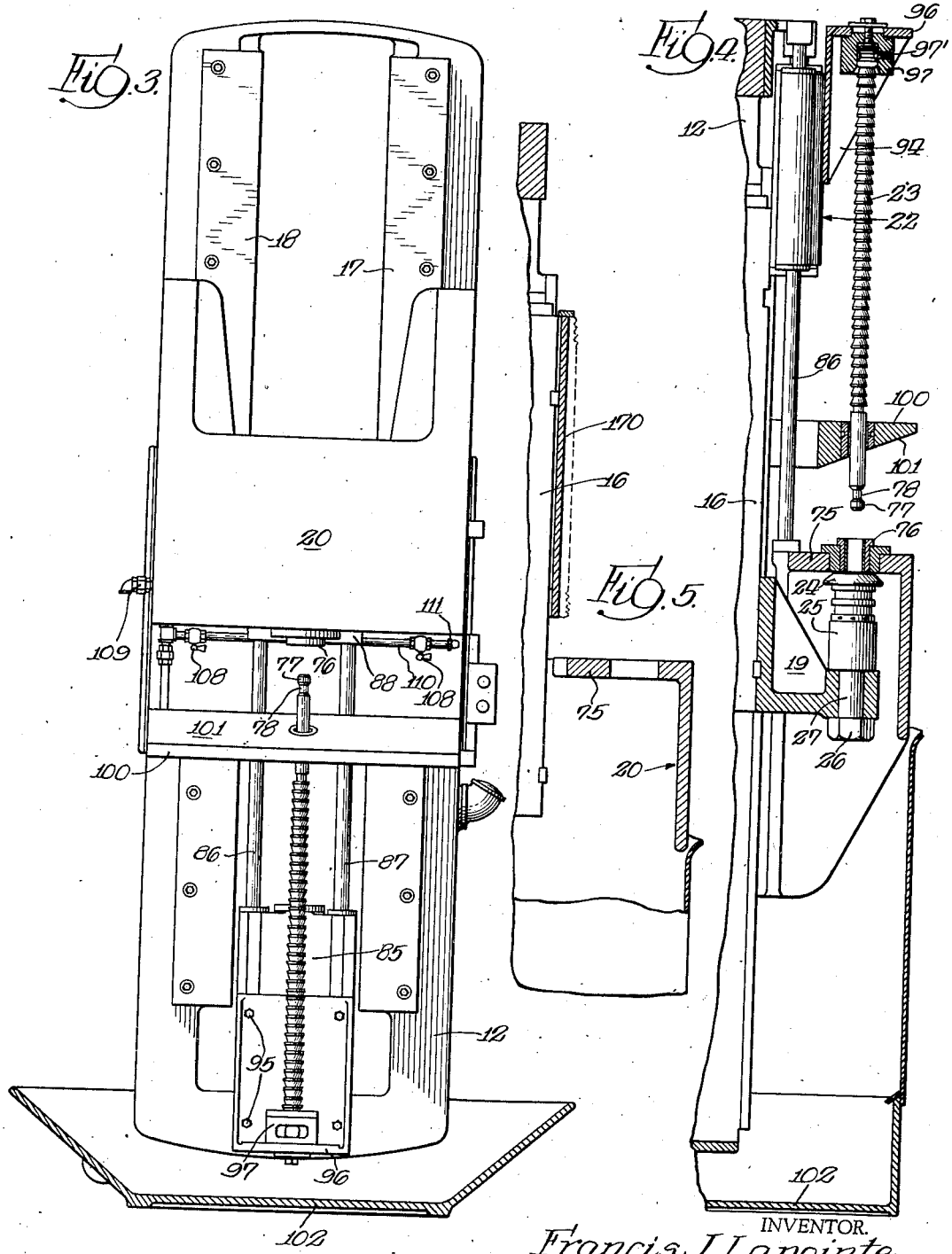

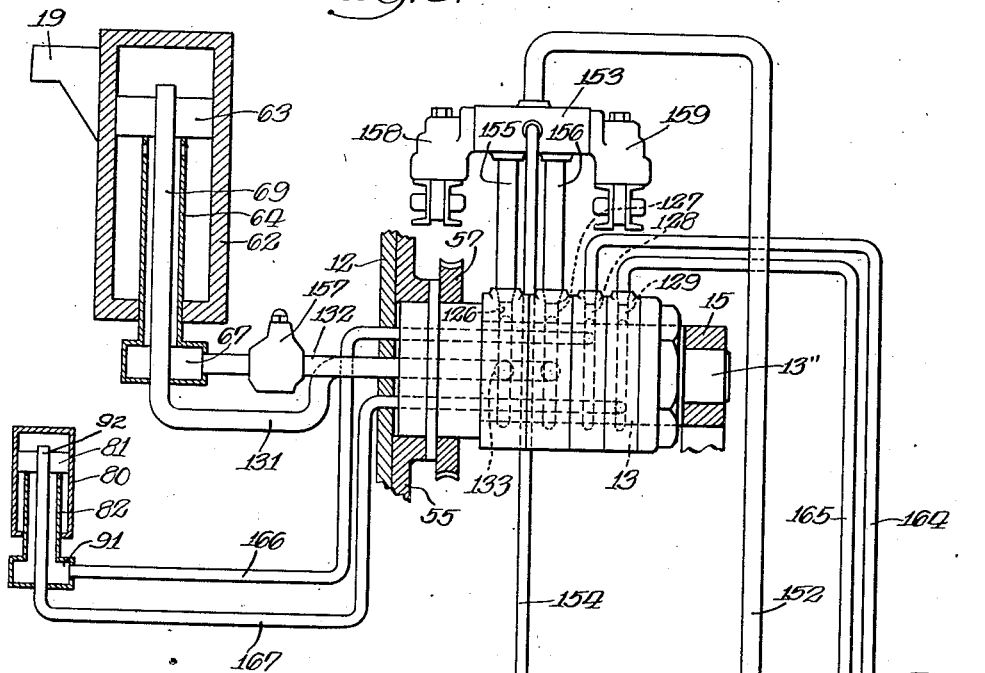
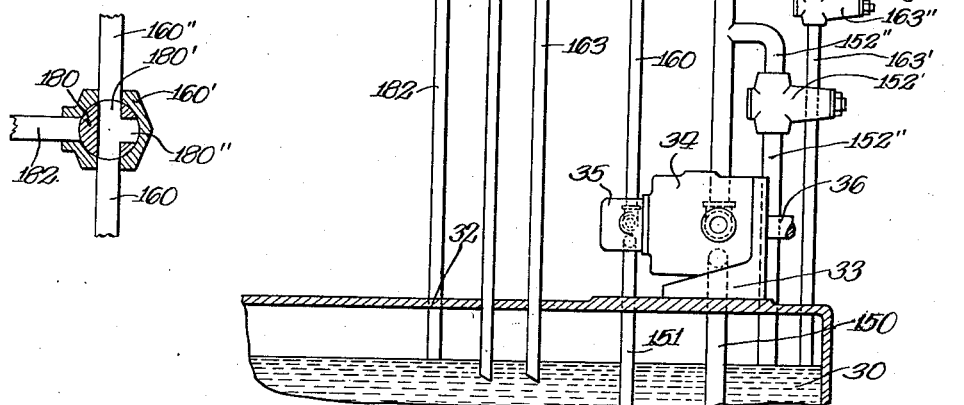

Patented Oct. 3, 1939

2,174,984

UNITED STATES PATENT OFFICE 2,174,984

BROACHING MACHINE

Francis J. Lapointe, Ann Arbor, Mich., assignor to Sundstrand Machine Tool Co., Rockford, Ill., a corporation of Illinois Application October 10, 1938, Serial No. 234,084

11 Claims. (Cl. 90—33)

More particularly, the invention relates to a broaching machine arranged to be operated as a pull-up type of machine or, alternatively, as a pull-down type of machine, it being the general object of the invention to provide a new and improved machine capable of such alternative operation.

Another object is to provide a new and improved broaching machine having an upstanding column, an elongated frame element on which a broach supporting ram and a work supporting table are mounted, and means for pivotally supporting said frame element on the column so that the frame element may be swung through 180° from a position wherein the ram is adjacent the top of the machine and arranged for a pull-up broaching operation to a position wherein the ram is adjacent the bottom of the machine and arranged for a pull-down broaching operation.

Another object is to provide such a new and improved broaching machine embodying an elevator device for handling the broach also carried on the pivotally mounted frame element.

Another object is to provide such a broaching machine embodying novel means for pivotally supporting the swingable frame element on the column and for conducting fluid under pressure to piston and cylinder devices for actuating the ram and broach elevator.

Further objects will become readily apparent from the following detailed description taken in connection with the accompanying drawings, wherein:

Fig. 3 is a front elevation with the chip pan shown in section.

Fig. 4 is a fragmentary central section with the machine arranged for pull-down broaching.

Fig. 5 is a fragmentary central section similar to Fig. 4 but with the machine arranged for pull-down surface broaching.

Fig. 9 is a fluid circuit diagram.

Fig. 10 is a fragmentary section through a control valve.

Figure 1:
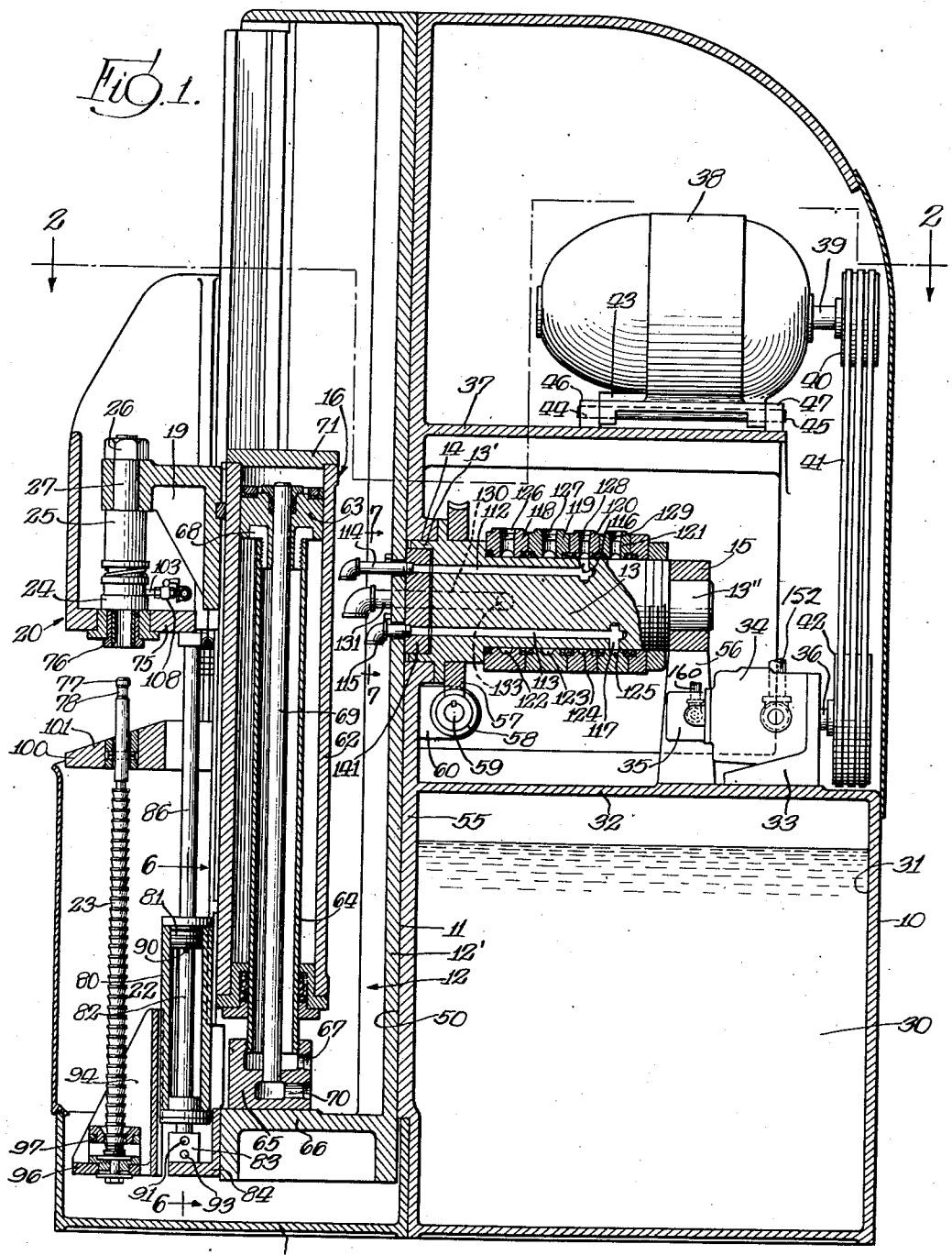
Fig. 1 is a vertical central section through a preferred form of the invention approximately along the line 1—1 of Fig. 2, illustrating the machine arranged for pull-up broaching.

While I have shown in the drawings and shall hereinafter describe in detail a preferred form of the invention, it is to be understood that I do not intend to limit the invention to the particular form and arrangement shown, it being contemplated that various modifications and alternative constructions may be made by those skilled in the art without departing from the spirit and scope of the appended claims.

As illustrated in the drawings, the invention comprises generally an upstanding support or column 10 provided with a flat, forward face 11, an elongated frame element or bed 12 pivotally mounted on the column 10 by means of a shaft or journal 13 and bearings 14 and 15, a ram 16 reciprocably mounted in ways 17 and 18 on the frame element 12, a broach supporting head 19 secured to one end of the ram 16, a work table 20 secured to the frame element 12 and a broach elevator 22 also mounted on the frame element 12. In the positions shown in Figs. 1, 2 and 3, the frame element or bed 12 is secured in upright position against the face 11 of the column 10 with the broach supporting head 19 arranged for movement upwardly from the position shown in Fig. 1 for pull-up broaching. The elevator 22 is then adjacent the bottom of the machine and arranged to handle a broach 23 when disengaged from a broach puller or chuck 24 which is secured to the head 19 by means of a shank 25 and a nut 26 threaded on a reduced upper end 27 thereof.

The column 10 is herein shown as comprising a lower compartment or reservoir 30 for holding a supply of fluid such as oil for purposes hereinafter more fully described. A transversely extending wall 32 forms the upper end of the reservoir 30 and also serves as a support for a fluid pumping means 33 having a high pressure portion 34 and a low pressure portion 35, both driven by means of a shaft 36. An upper transversely extending wall 37 in the column serves as a support for an electric driving motor 38. The shaft 39 of this motor is equipped with a multiple grooved pulley 40 and is arranged to drive the pump shaft 36 by means of a plurality of belts 41 and a similarly grooved pulley 42 on the pump shaft 36. Preferably, the motor is mounted on a sub-base 43 which is pivotally supported at 44 and 45 on brackets 46 and 47 extending upwardly from the horizontal wall 37 of the column. Suitable screw devices 49 are screw-threaded through the sub-base and engage the upper surface of the wall 37 to facilitate tightening of the belts 41.

Figure 2:
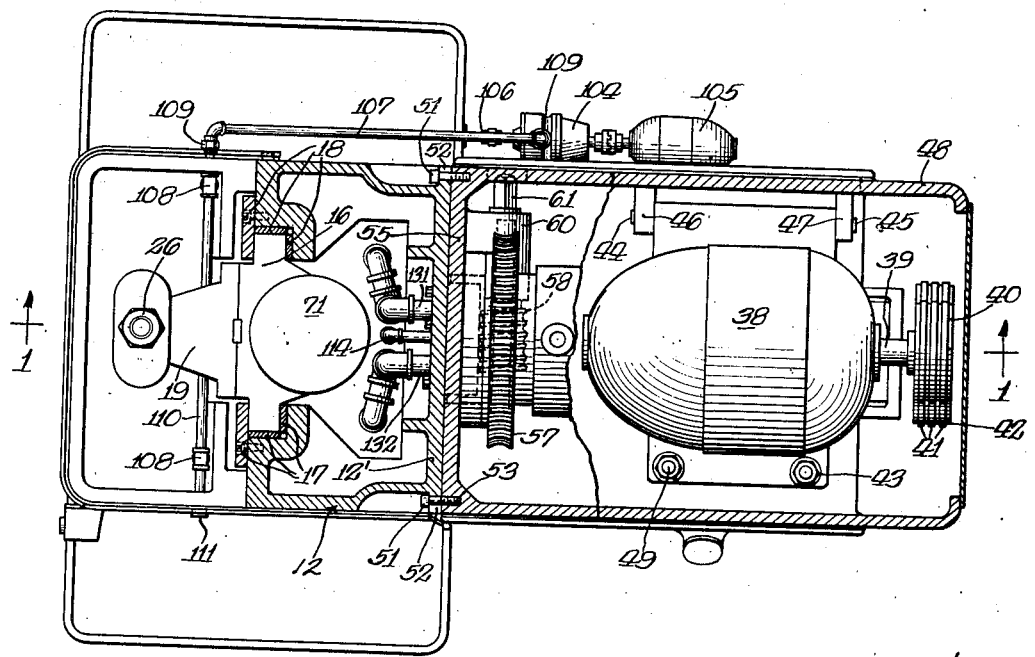
Fig. 2 is a horizontal section approximately along the line 2—2 of Fig. 1.

The frame element 12 is herein shown with a flat surface 50 positioned against the adjacent flat surface 11 of the column 10 and is adapted to be bolted in the position shown in Figs. 1 to 3 by means of a plurality of bolts 51 which extend through apertures in flanges 52 on the frame element 12 and into a threaded socket 53 in the column 10 (Fig. 2). Preferably, a number of such bolts are spaced vertically apart along each side edge of the frame element 12.

The cylindrical shaft or journal 13 referred to hereinbefore is secured to the midportion of the frame element 12 for the purpose of mounting said frame element pivotally on the column 10. As shown most clearly in Figs. 1, 7 and 8, the left hand end of the shaft 13 has an enlarged journal portion 13' rotatably mounted in the bearing 14 formed in the front wall 55 of the column and has a reduced journal portion 13'' rotatably mounted in the bearing 15 which is secured to the upper end of a bracket 56 extending upwardly from the transverse wall 32 of the column. Adjacent the left hand end of the shaft 13, a worm wheel 57 is non-rotatably secured thereto. This worm wheel meshes with a worm 58 supported on a horizontal shaft 59 rotatably mounted in a bracket 60 extending rearwardly from the forward wall 55 of the column. Preferably, the shaft 59 is provided with a squared end 61 (Fig. 2) suitable for engagement with a wrench or other tool so that by removing the bolts 51 the frame element 12 may be swung through an arc of 180° from the position shown in Figs. 1 to 3 to the position shown in Fig. 4 for the purpose of changing the machine from pull-up operation to pull-down operation.

Figure 7:
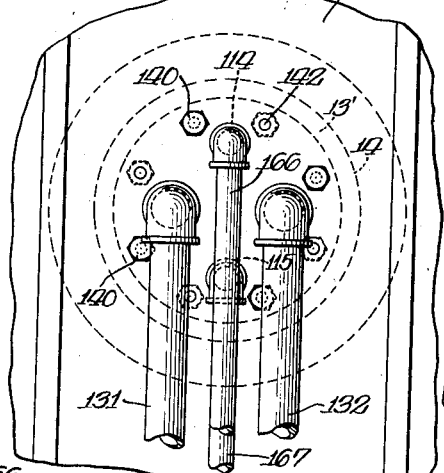
Fig. 7 is a fragmentary view along the line 7—7 of Fig. 1.
Figure 8:
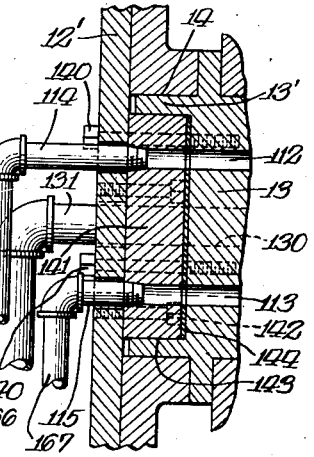
Fig. 8 is a section along the line 8—8 of Fig. 7.

In the form shown in the drawings, with particular reference to Figs. 1, 7 and 8, the shaft 13 is secured to the frame element 12 by a plurality of bolts 140 which extend through openings in a rear wall 12' of the frame element and into screw-threaded engagement with the shaft 13. In order to locate the shaft on the frame element and to provide a more rigid connection therebetween, a cylindrical hub 141 is secured to the frame element by means of a plurality of bolts 142, which have their heads countersunk in the hub 141 and are threaded into the frame element wall 12'. The shaft 13 is provided with a cylindrical recess 143 so that the hub may be fitted into the adjacent end of the shaft. A gasket 144 may be inserted between the end of the hub and the recess 143 so as to seal the parts.

As illustrated herein, the ram 16 has a cylinder 62 which is arranged to be reciprocated vertically by means of a piston 63 secured to the upper end of a tubular piston rod 64, the lower end of which is anchored in a block 65 suitably secured to an end wall 66 of the frame element 12. The block 65 is provided with a port 67 communicating with the interior of the tubular piston rod 64, and the piston 63 is provided with a plurality of ports 68 for establishing communication between the interior of the tubular rod 64 and the space intermediate said rod and the cylinder 62, in order to conduct fluid from the lower end of the cylinder during a broaching operation. Fluid may be supplied to the upper end of the cylinder during a broaching operation by means of an inner tubular rod 69 which at its upper end extends through the piston 63 so as to communicate with the upper end of the cylinder and at its lower end is also anchored to the block 65. The lower end of the rod 69 communicates with a port 70 in the block 65.

The cylinder 62 is closed at its upper end by means of a head 71.

In the form shown herein, the work support 20 is in the form of a hollow bracket or casting secured to the front of the frame element 12 and has a horizontal wall 75 apertured to receive a work bushing 76. This bushing is aligned with the opening in the broach holder chuck 24, which broach holder is preferably of an automatic type, as shown in my Patent No. 2,027,486, dated January 14, 1936. The broach 23 is provided with a head 77 and a reduced portion 78 to facilitate connection of the broach to the chuck 24.

Figure 6:
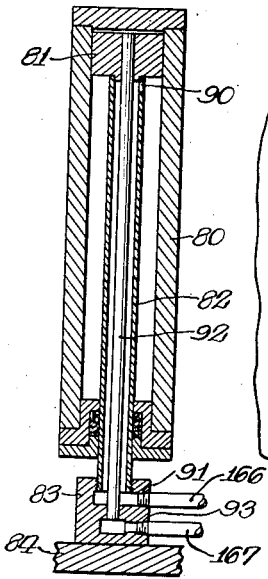
Fig. 6 is a fragmentary section approximately along the line 6—6 of Fig. 1.

In the preferred form of the invention, the elevator 22 is provided for handling the broach 23 when it is disconnected from the chuck 24. As shown in Figs. 1 to 3, the elevator comprises a vertically movable cylinder 80 having a cooperating stationary piston 81 mounted on a vertically extending hollow rod 82. The rod 82 is secured at its upper end to the piston 81 and is secured at its lower end to a block 83 which in turn is secured to an angle bracket 84 mounted on the lower end of the frame element 12. Preferably, the cylinder 80 is formed integrally with a slide 85 (Fig. 3) movable vertically on a pair of spaced cylindrical slide rods 86 and 87 which are anchored at their upper ends to a member 88 suitably secured to the front surface of the frame element 12, and are anchored at their lower ends in the angle bracket 84. As illustrated most clearly in Fig. 6, the elevator piston and cylinder device is similar in construction to the ram piston and cylinder device. Thus, the tubular rod 82 has a port 90 just below the piston 81 for communication with the lower end of the cylinder 80, and at its lower end said rod is anchored in the block 83 so as to communicate with a port 91. An inner tubular rod 92 extends upwardly through the piston 81 so as to communicate with the upper end of the cylinder, said rod being anchored at its lower end in the block 83 so as to communicate with a port 93. The elevator 22 also includes a bracket member 94 secured by a plurality of bolts 95 to the front of the slide 85. This bracket member has a horizontally extending shelf 96 to which a broach receiving bushing assembly 97 is secured in vertical alignment with the work bushing 76 and chuck 24. This broach bushing assembly is of well known construction and is arranged to hold the broach in an upright position when the broach is disengaged from the chuck 24. It is preferably provided with a detent device 97' as shown in Fig. 4 so as to be capable of supporting the broach 23 when the machine is arranged for pull-down broaching.

Preferably, an angle table 100 is also secured to the frame element 12 in a position below the work support 20, as shown in Fig. 1. This table has an angular or inclined surface 101 which functions to discharge completed work pieces forwardly from the machine.

A hollow base 102 is located beneath the frame element 12 and broach handling mechanism so as to form a receptacle for cutting coolant discharged onto the broach by means including a nozzle device 103. This base may be suitably bolted to the column 12. A coolant pump 104 (Fig. 2) secured to the lower portion of the column 12 is driven by means of an electric motor 105 and has an intake conduit 106 leading to the hollow base 102 and a discharge conduit 107 leading to the nozzle 103. Valves 108 are preferably provided in the supply conduit. It is contemplated that the conduit will be broken by means of couplings 109 when the machine is converted from a pull-up machine to a pull-down machine, the supply conduit 107 having a horizontal stretch 110 projecting from both sides of the frame element 12 to facilitate connecting the upper coupling 109 to either end thereof. A plug 111 closes the uncoupled end.

In order to supply fluid to the cylinders of the ram and elevator motors, means is provided for conducting the fluid through the shaft 13 so that the fluid connections are not interrupted or disturbed when the machine is changed from pull-up broaching to pull-down broaching and vice versa. As illustrated herein, the journal 13 is provided with longitudinally extending passages 112 and 113, the front ends of which are connected respectively to the elevator ports 91 and 93 by means of conduits 114 and 115. The other ends of the passages 112 and 113 terminate in radially extending ports 116 and 117 respectively spaced apart longitudinally of the journal. The intermediate portion of the journal is surrounded by a plurality of rings 118, 119, 120 and 121 which are provided respectively with annular fluid conducting recesses 122, 123, 124, and 125. These rings are also provided with ports 126, 127, 128 and 129 respectively which communicate with the annular recesses and are threaded for the reception of suitable fluid conduits. The radial ports 116 and 117 communicate respectively with the annular recesses 124 and 125. The journal 13 is similarly provided with two longitudinally extending passages 130 which communicate at their forward ends with conduits 131 and 132, these conduits communicating respectively with the ram ports 67 and 70. At their rear ends, the passages 130 communicate with radially extending ports 133, one of which communicates with the annular recess 122 and the other with the annular recess 123.

The fluid connections between the pumps 34 and 35 and the ram and elevator cylinders will be most readily apparent from Fig. 9 which illustrates these connections in somewhat diagrammatic form. As shown in Fig. 9, the pump 34 is provided with an intake pipe 150 and the pump 35 is provided with an intake pipe 151. A discharge conduit 152 extends from the pump 34 to a solenoid operated four-way valve 153 which valve is preferably provided with a spring centered neutral position wherein fluid is bypassed back to the reservoir 30 through a return conduit 154. A return conduit 152" leads from the conduit 152 and is provided with a relief valve 152'. This valve is adjusted to open at the maximum pressure which the fluid in conduit 152 should attain. Conduits 155 and 156 lead from the valve 153 to the ports 126 and 127 in the rings 118 and 119 for the purpose of conducting fluid to and from the opposite ends of the ram cylinder 62. The conduits 131 and 132 complete the connections to the ports 70 and 67 respectively. Preferably, a suitable back pressure valve 157 is provided in the conduit 132 so as to maintain a back pressure on the piston 63 during the broaching stroke, a practice well known in the art. The valve 153 is arranged to be operated by means of solenoid devices 158 and 159. The valve and solenoid devices are not illustrated and described in detail since it is contemplated that various types of valves may be used in the conduits intermediate the pump and the passages in the shaft 13, the disclosure herein illustrating generally a means for supplying fluid to the shaft passages.

The pump 35 supplies fluid to a conduit 160 which communicates through a control valve 160' and conduit 160" with a single end solenoid operated four-way valve 161, this valve being preferably of a type which is moved to one position by means of a solenoid 162 and is returned to its other position by means of a spring. A return conduit 163 leads from the valve 161 back to the reservoir 30. A return conduit 163' leads from the conduit 160 and is provided with a relief valve 163" which is normally set to open at the maximum pressure at which the fluid in conduit 160 is intended to operate. Conduits 164 and 165 lead from the valve 161 to the ports 128 and 129 respectively in the rings 120 and 121 for the purpose of supplying fluid to and conducting it from the opposite ends of the cylinder 80 of the elevator. Conduits 166 and 167 connect at one end with the conduits 114 and 115 respectively and at their other ends communicate with the ports 91 and 93 respectively. The control valve 160' is included to permit the elevator to be rendered inoperative. As shown in Figs. 9 and 10, this valve has a rotatable member 180 provided with a diametrical passage 181 and a radial passage 182 at right angles thereto. In the position shown in Fig. 10, the passage 180 connects conduit 160 to conduit 160" so as to provide fluid to operate the elevator. By rotating the member 180 through an angle of 90° in a clockwise direction, the passages 180 and 181 would cooperate to direct the fluid from conduit 160 into a return conduit 182.

The valves and control circuit therefor may be of the type disclosed in my prior Patent No. 2,068,884, dated January 26, 1937.

As illustrated in Figs. 1 to 3, the preferred form of the invention is arranged for pull-up broaching. Briefly, the operation of the machine consists in placing a work piece against the work bushing 76 after which the elevator raises the broach 23 into engagement with the chuck 24. Thereafter the ram rises, drawing the broach 23 through the work, the broach at the same time being disconnected from the elevator bushing assembly 97. Upon completion of the broaching operation, the work falls down onto the angle table 101 and slides forwardly therefrom. The ram is then lowered until the chuck 24 engages the horizontal wall 75 of the work support 20, whereupon the broach is released from the chuck and drops down into the bushing assembly 97 to condition the machine for the reception of another work piece.

In order to change the machine for pull-down broaching, it is merely necessary to remove the bolts 51 (and disconnect the coolant couplings 109) and then swing the frame element 12 on its pivot shaft 13 through an arc of 180°. This is accomplished by means of a suitable tool and the worm and worm wheel mechanism 58, 57. This non-reversible gear mechanism is preferably provided so that the swinging movement of the frame element 12 is always under the control of the operator even though this element may be unbalanced. After the frame element has been shifted, the bolts 51 are replaced and the coolant connection is again completed, whereupon the machine is in condition for operation. The parts are then as illustrated in Fig. 4. By placing a work piece on the bushing 76, the broach 23 may be lowered into engagement with the chuck 24, after which the ram is lowered to draw the broach through the work and at the same time disconnect it from the elevator bushing 97. Upon the completion of the broaching operation, the finished work piece is removed, after which the ram is returned upwardly until the chuck 24, by engaging the work support wall 75, releases the broach 23 so that it may be engaged and withdrawn upwardly by means of the elevator 22. The machine is then in condition for the reception of another work piece.

As illustrated in Fig. 5, the machine is also adapted for pull-down broaching, the broach supporting head 19 and elevator mechanism being removed so that a surface broach 170 may be secured directly to the front face of the ram 16.

It is believed readily apparent that the invention provides a universal broaching machine of relatively simple construction and one wherein it is possible to effect both pull-up and pull-down broaching in a single machine. By mounting the prime mover on the column and providing suitable connections intermediate the prime mover and the reciprocatory broach supporting head and the elevator mechanism effective to transmit power to these elements in either position of the bed on the column, the change-over of the machine from pull-up broaching to pull-down broaching is readily made. It is contemplated that various parts of the machine herein described as secured one to another may be so secured by means of bolts or welding or other methods well known in the art.

I claim as my invention:

1. A vertical broaching machine having, in combination, an upstanding column, an elongated frame element extending vertically along the forward face of said column, a broach supporting ram slidably mounted on the upper portion of said frame element for movement longitudinally thereon, a work supporting table secured to said frame element adjacent the midportion thereof, means on said frame element for reciprocating said ram, and means for securing said frame element pivotally to said column so as to permit the frame element to be inverted.

2. A vertical broaching machine having, in combination, an upstanding column, an elongated bed extending vertically along the forward face of said column, a broach chuck supporting head slidably mounted on the upper portion of said bed for movement vertically thereon, a broach handling elevator slidably mounted on the lower portion of said bed for movement vertically thereon, a work supporting table secured to said bed intermediate said head and said elevator, means for reciprocating said head, means for reciprocating said elevator, and means for securing said bed pivotally to said column to permit the bed and parts thereon to be inverted with respect to said column.

3. A vertical broaching machine having, in combination, an upstanding column, an elongated bed extending vertically along the forward face of said column, a broach chuck supporting head slidably mounted on the upper portion of said bed for movement vertically thereon, a work supporting table secured to said bed below said head, means on said bed operable to reciprocate said head, and means for securing said bed pivotally to said column to permit the bed and parts thereon to be inverted with respect to said column comprising horizontally spaced bearings on said column and a journal secured to said bed and rotatable in said bearings.

4. A vertical broaching machine having, in combination, an upstanding column, an elongated bed extending vertically along the front of said column, a broach chuck supporting head slidably mounted on the upper portion of said bed for movement vertically thereon, a work supporting table secured to said bed below said head, fluid operated means on said bed for reciprocating said head, and means for securing said bed pivotally to said column to permit the bed and parts thereon to be inverted with respect to said column comprising bearing means on said column, a journal secured to said bed and rotatable in said bearing means and means for conducting fluid to said means for reciprocating said head including fluid passages in said journal terminating at one end in the periphery thereof and means on said column surrounding a portion of said journal and having annular recesses communicating with said passages.

5. A vertical broaching machine having, in combination, an upstanding column, an elongated bed extending vertically along the forward face of said column, a broach chuck supporting head slidably mounted on the upper portion of said bed for movement vertically thereon, a broach handling elevator slidably mounted on the lower portion of said bed for movement vertically thereon, a work supporting table secured to said bed intermediate said head and said elevator, means for reciprocating said head, means for reciprocating said elevator, and means for securing said bed pivotally to said column to permit the bed and parts thereon to be inverted with respect to said column comprising horizontally spaced bearings on said column and a journal secured to said bed and rotatable in said bearings.

6. A vertical broaching machine having, in combination, an upstanding column, an elongated bed extending vertically along the front of said column, a broach chuck supporting head slidably mounted on the upper portion of said bed for movement vertically thereon, a work supporting table secured to said bed below said head, a broach handling elevator slidably mounted on the lower portion of said bed for movement vertically thereon, fluid operated means on said bed for reciprocating said head, fluid operated means on said bed for reciprocating said elevator, and means for securing said bed pivotally to said column to permit the bed and parts thereon to be inverted with respect to said column comprising bearing means on said column, a journal secured to said bed and rotatable in said bearing means and means for conducting fluid to said fluid operated means on said head including conduits connected thereto, fluid passages in said journal connected at one end to said conduits and terminating at their other ends in the periphery of the journal and means on said column surrounding a portion of said journal and having annular fluid recesses communicating with said passages in both positions of said bed.

7. A vertical broaching machine having, in combination, an upstanding bed, a broach chuck supporting head slidably mounted on the upper portion of said bed for movement vertically thereon, fluid operated means on said bed for reciprocating said head through a pull-up broaching stroke and a downward return stroke, a work support secured to said bed below said head, and means for supporting said bed in an upstanding position and for inverting said bed to form a pull-down broaching machine.

8. A vertical broaching machine having, in combination, an upstanding column, an elongated frame element extending vertically along the forward face of said column, a broach supporting ram slidably mounted on the upper portion of said frame element for movement longitudinally thereon, a work supporting table secured to said frame element adjacent the midportion thereof, means on said frame element for reciprocating said ram, means for securing said frame element pivotally to said column so as to permit the frame element to be inverted, and non-reversible gearing means for pivoting said frame element with respect to said column.

9. A vertical broaching machine having, in combination, an upstanding column, an elongated bed extending vertically along the forward face of said column, a broach chuck supporting head slidably mounted on the upper portion of said bed for movement vertically thereon, a work supporting table secured to said bed below said head, means on said bed operable to reciprocate said head, means for securing said bed pivotally to said column to permit the bed and parts thereon to be inverted with respect to said column comprising horizontally spaced bearings on said column and a journal secured to said bed and rotatable in said bearings, and means for inverting said bed on said column comprising a worm wheel secured to said journal, a worm rotatably mounted on said column meshing with said worm wheel and means for rotating said worm.

10. A vertical broaching machine having, in combination, an upstanding bed, a broach chuck supporting head slidably mounted on the upper portion of said bed for movement vertically thereon, fluid operated means on said bed for reciprocating said head through a pull-up broaching stroke and a downward return stroke, a work support secured to said bed below said head, means for supporting said bed in an upstanding position and for inverting said bed to form a pull-down broaching machine, and means for supplying fluid under pressure to said fluid operated means in either position of said bed including pump means on said supporting means and means forming flexible conduit connections between said pump means and fluid operated means.

11. A vertical broaching machine having, in combination, an upstanding column, an elongated bed extending vertically along the forward face of said column, a broach chuck supporting head slidably mounted on the upper portion of said bed for movement vertically thereon, a broach handling elevator slidably mounted on the lower portion of said bed for movement vertically thereon, a work supporting table secured to said bed intermediate said head and said elevator, means for reciprocating said head, means for reciprocating said elevator, means for securing said bed pivotally to said column to permit the bed and parts thereon to be inverted with respect to said column, and means for reciprocating said broach chuck and broach handling elevator comprising power means on said column and power transmitting connections effective in either position of said bed on said column.

FRANCIS J. LAPOINTE.